（12） United States Patent
Kitoh et al.

(10) Patent No.: US 6,735,358 B2
(45) Date of Patent: May 11, 2004

(54) OPTICAL MULTIPLEXER AND OPTICAL DEMULTIPLEXER

(75) Inventors: Tsutomu Kitoh, Mito (JP); Yasuyuki Inoue, Mito (JP); Manabu Oguma, Mito (JP); Yoshinori Hibino, Mito (JP); Kaname Jinguji, Mito (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 117 days.

(21) Appl. No.: 10/067,065

(22) Filed: Feb. 4, 2002

(65) Prior Publication Data
US 2002/0106147 A1 Aug. 8, 2002

(30) Foreign Application Priority Data
Feb. 7, 2001 (JP) .......................... 2001-31483

(51) Int. Cl.[7] ................................ G02B 6/28
(52) U.S. Cl. ..................... 385/24; 385/15; 385/37; 359/127; 398/41; 398/43
(58) Field of Search ................ 385/24, 15, 37; 398/147, 149, 92, 79, 41, 43; 359/127

(56) References Cited
PUBLICATIONS

M. Oguma, et al., *Flat–passband Interleave Filter with 200 GHz Channel Spacing Based On Planar Lightwave Circuit–type Lattice Structure*, Electornics Letters, Jul. 20, 2000, vol. 36, No. 15, pp. 1299–1300.

T. Chiba et al., *Wavelength Splitters for DWDM Systems*, LEOS Topical Meeting 2001, MD2.2, 2001, pp. 11–12.

*Primary Examiner*—Hemang Sanghavi
*Assistant Examiner*—Eric Wong
(74) *Attorney, Agent, or Firm*—Workman Nydegger

(57) ABSTRACT

The present invention provides an optical demultiplexer and an optical multiplexer the transmission characteristics of which are unlikely to be affected by fabrication errors and which have small group delay dispersion. A cross output port (X-OUT) of a second optical demultiplexer element (DEMUX) is selected, and a through output port (T-OUT) of a third DEMUX is selected. A T-OUT of a first DEMUX has a passband equal to the X-OUT of the second DEMUX, and a X-OUT of the first DEMUX has a passband equal to the T-OUT of the third DEMUX. The T-OUT of the first DEMUX has group delay characteristics opposite to those of the X-OUT of the second DEMUX, and the X-OUT of the first DEMUX has group delay characteristics opposite to those of the T-OUT of the third DEMUX.

2 Claims, 10 Drawing Sheets

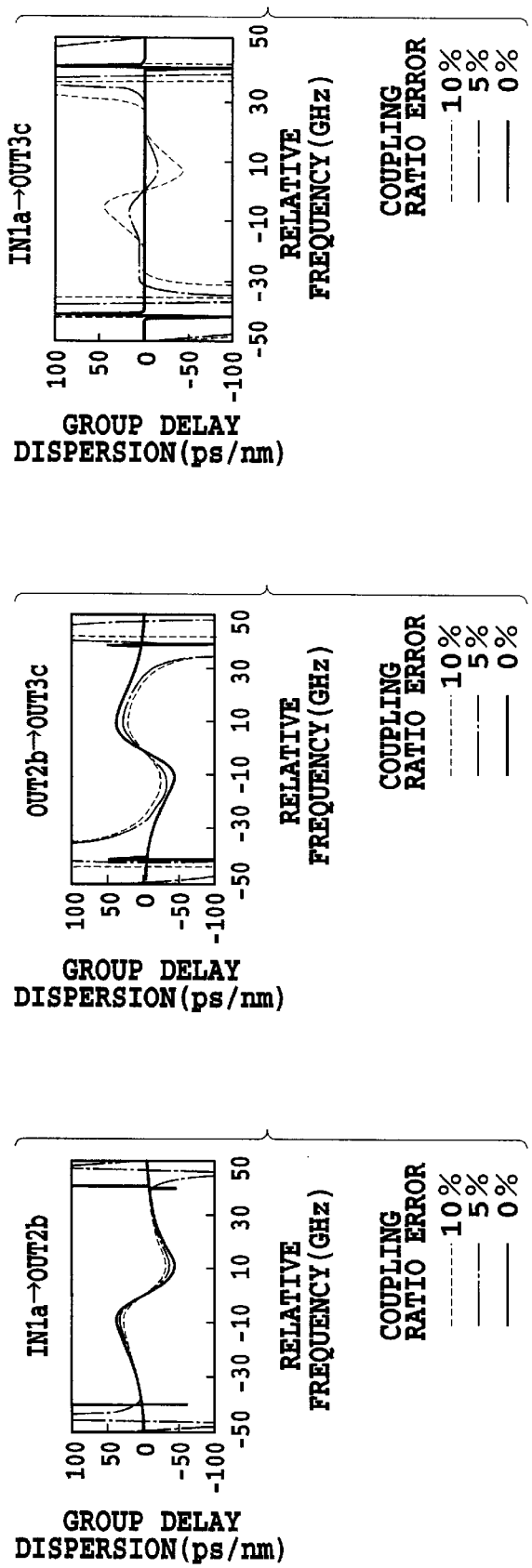

OPTICAL MULTIPLEXER AND OPTICAL DEMULTIPLEXER

This application is based on Patent Application No. 2001-31483 filed Feb. 7, 2001 in Japan, the content of which is incorporated hereinto by reference.

BACKGROUND OF THE INVENTION

1. Field of the Invention

The present invention relates to an optical demultiplexer and an optical multiplexer having optical multiplexer or demultiplexer elements of a multi-stage Mach-Zehnder configuration connected together in tandem and used in fields such as optical communication, photonic switching, and optical computing.

2. Description of the Related Art

In recent years, an optical multiplexer and an optical demultiplexer have been more and more important in the fields of optical communication, photonic switching, and optical computing and notably in the field of wavelength multiplexing optical communication in which optical signals of different wavelengths are multiplexed for communication; the optical multiplexer multiplexing two signal lights of different wavelengths and outputting the multiplexed light from one output port, the optical demultiplexer demultiplexing a light having its wavelength multiplexed and outputs the demultiplexed lights from two output ports. Further, an interleave filter in which a passband and a stopband have an equal bandwidth is gathering much attention as a part that is combined with an AWG (Arrayed Waveguide Grating) to double the number of AWG channels.

As a part that meets these requirements, for example, M. Oguma, et al., "Flat-passband interleave filter with 200 GHz channel spacing based on planar lightwave circuit-type lattice structure", Electronics Letter, 2000, Vol. 36, no. 15, pp. 1299–1300 describes an optical multiplexer or demultiplexer elements in which the passband and stopband have flat characteristics. Further, T. Chiba, et al., "Wavelength Splitters for DWDM Systems", LEOS Topical Meeting 2001, MD2.2, pp. 11–12 reports a composite optical multiplexer or demultiplexer having optical multiplexer or demultiplexer elements connected together in tandem in two stages because a single optical multiplexer or demultiplexer element does not provide a sufficient stop value.

FIG. 9 shows the circuit configuration of a conventional optical demultiplexer. The demultiplexer has two-stage optical demultiplexer elements 90-1, 90-2, and 90-3 connected together in tandem in two stages and having optical path length differences of 1:−2, 1:−2, and −1:2, respectively. The optical path length of difference is normalized a unit path length difference ΔL. The positive optical path length difference is defined to mean that in the two arms of each Mach-Zehnder circuit, the upper arm has a larger optical path length than the lower arm. On the other hand, the negative optical path length difference is defined to mean that the lower arm has a larger optical path length than the upper arm. In the 1st stage, the one two-stage optical demultiplexer element 90-1 (corresponding to N=2) is disposed, and in the 2nd stage, the two two-stage optical demultiplexer elements 90-2 and 90-3 are disposed.

The two-stage optical demultiplexer elements 90-1, 90-2, and 90-3 are constructed in a two-stage Mach-Zehnder form using three directional couplers 93-1 to 93-9 for each element. Phase shifters 94-1 to 94-6 are installed on each optical path to control phase.

With a tandem-connected optical demultiplexer, when a wavelength multiplex signal of an equi-channel spacing $\lambda 1$, $\lambda 2, \ldots, \lambda M$ (M is an integer equal to or larger than 2) is input from an input port IN1$a$ of the two-stage optical demultiplexer element 90-1 in the 1st stage, a wavelength multiplex signal of $\lambda 1, \lambda 3, \ldots, \lambda M-1$ is output from one selected output port OUT2$c$ of the two-stage optical demultiplexer element 90-2 in the 2nd stage, while a wavelength multiplex signal of $\lambda 2, \lambda 4, \ldots, \lambda M$ is output from one selected output port OUT4$c$ of the two-stage optical demultiplexer element 90-3 in the 2nd stage.

With such a tandem-connected optical demultiplexer, the output ports can be selected in 2×2=4 ways depending on which of the two output ports OUT1$c$ and OUT2$c$ of the two-stage optical demultiplexer element 90-2 in the 2nd stage is selected and on which of the two output ports OUT3$c$ and OUT4$c$ of the two-stage optical demultiplexer element 90-3 in the 2nd stage is selected.

The through output port (that is, the output port having its optical waveguide physically coupled to the corresponding input port) OUT2$c$ of the two-stage optical demultiplexer element 90-2 is selected, the optical demultiplexer element 90-2 being connected to the through output port OUT1$b$ of the two-stage optical demultiplexer element 90-1 in the 1st stage. The cross output port (that is, the output port not having its optical waveguide physically coupled to the corresponding input port) OUT4$c$ of the two-stage optical demultiplexer element 90-3 is selected, the optical demultiplexer element 90-3 being connected to the cross output port OUT2$b$ of the two-stage optical demultiplexer element 90-2 in the 1st stage. In a conventional optical demultiplexer, the output ports are selected so that the 1st stage through output port and the 2nd stage through output port are combined together and the 1st stage cross output port and the 2nd stage cross output port are combined together.

The output ports are thus selected because group delays in the 1st and 2nd stages offset each other to obtain zero group delay characteristics. Furthermore, even with a fabrication error in the single optical multiplexer or demultiplexer, the offset of the group delays serves to maintain substantially zero group delays. Thus, the conventional optical multiplexer or demultiplexer is characterized in that the group delay characteristics are unlikely to be affected by fabrication errors in the circuit.

However, although the group delay characteristics of the conventional optical multiplexer or demultiplexer is unlikely to be affected by fabrication errors in the circuit and are thus substantially zero, its transmission characteristics are prone to be affected by fabrication errors. A problem of the conventional optical multiplexer or demultiplexer is that a good stopband value is not obtained in the presence of a fabrication error.

When the optical multiplexer or demultiplexer is actually used, group delays have only to be maintained at a certain allowable value or less, and the optical multiplexer or demultiplexer element often needs to have as good transmission characteristics as possible.

SUMMARY OF THE INVENTION

It is an object of the present invention to provide an optical demultiplexer and an optical multiplexer which have transmission characteristics unlikely to be affected by fabrication errors and which have small group delay dispersions.

To attain this object, an optical demultiplexer comprising 2-input and 2-output (hereinafter referred to as the "2×2") optical demultiplexer elements composed of optical couplers that couple two optical waveguides together at N+1 locations (N is an integer equal to or larger than 2), each the 2×2 optical demultiplexer element having a through output port and a cross output port for a single input port, in which a through output port of a first 2×2 optical demultiplexer element is connected to an input port of a second 2×2 optical demultiplexer element and a cross output port of the first 2×2 optical demultiplexer element is connected to an input port of a third 2×2 optical demultiplexer element, so that if a wavelength multiplex signal of a specified wavelength interval of $\lambda 1, \lambda 2, \ldots, \lambda M$ (M is an integer equal to or larger than 2) is input to an input port of the first 2×2 optical demultiplexer element, a wavelength multiplex signal of $\lambda 1, \lambda 3, \ldots, \lambda M-1$ is output from a selected output port of the second 2×2 optical demultiplexer element, while a wavelength multiplex signal of $\lambda 2, \lambda 4, \ldots, \lambda M$ is output from a selected output port of the third 2×2 optical demultiplexer element, wherein a cross output port of the second 2×2 optical demultiplexer element is selected, and a through output port of the third 2×2 optical demultiplexer element is selected, wherein the through output port of the first 2×2 optical demultiplexer element has a passband equal to that of the cross output port of the second 2×2 optical demultiplexer element, and the cross output port of the first 2×2 optical demultiplexer element has a passband equal to that of the through output port of the third 2×2 optical demultiplexer element, and wherein the through output port of the first 2×2 optical demultiplexer element has group delay characteristics opposite to those of the cross output port of the second 2×2 optical demultiplexer element, and the cross output port of the first 2×2 optical demultiplexer element has group delay characteristics opposite to those the through output port of the third 2×2 optical demultiplexer element.

According to this configuration, selection of the output ports eliminates differences in characteristics between the input port and the two output ports which differences result from a fabrication error in the circuit, thereby minimizing fabrication errors in transmission characteristics and maintaining group delay dispersions at an allowable value or less.

Further, an optical multiplexer comprising 2-input and 2-output (hereinafter referred to as the "2×2") optical multiplexer elements composed of optical couplers that couple two optical waveguides together at N+1 locations (N is an integer equal to or larger than 2), each the 2×2 optical multiplexer element having a through output port and a cross output port for a single input port, in which an output port of a first 2×2 optical multiplexer element is connected to a through input port of a third 2×2 optical multiplexer element and an output port of a second 2×2 optical multiplexer element is connected to a cross input port of the third 2×2 optical multiplexer element, so that if a wavelength multiplex signal of a specified wavelength interval of $\lambda 1, \lambda 3, \ldots, \lambda M-1$ (M is an integer equal to or larger than 2) is input to a selected input port of the first 2×2 optical multiplexer element, while a wavelength multiplex signal of a specified wavelength interval of $\lambda 2, \lambda 4, \ldots, \lambda M$ is input to a selected input port of the second 2×2 optical multiplexer element, then a wavelength multiplex signal of $\lambda 1, \lambda 2, \ldots, \lambda M$ is output from the output port of the third 2×2 optical multiplexer element, wherein a cross input port of the first 2×2 optical multiplexer element is selected, and a through input port of the second 2×2 optical multiplexer element is selected, wherein the through output port of the third 2×2 optical multiplexer element has a passband equal to that of the cross output port of the first 2×2 optical multiplexer element, and the cross output port of the third 2×2 optical multiplexer element has a passband equal to that of the through output port of the second 2×2 optical multiplexer element, and wherein the through output port of the third 2×2 optical multiplexer element has group delay characteristics opposite to those of the cross output port of the first 2×2 optical multiplexer element, and the cross output port of the third 2×2 optical multiplexer element has group delay characteristics opposite to those the through output port of the second 2×2 optical multiplexer element.

According to this configuration, selection of the input ports eliminates differences in characteristics between the two input ports and the output port which differences result from a fabrication error in the circuit, thereby minimizing fabrication errors in transmission characteristics and maintaining group delay dispersions at an allowable value or less.

According to the present invention, a certain level of fabrication error is allowed, thereby making it possible to produce an optical multiplexer or demultiplexer having high yield and mass productivity.

The above and other objects, effects, features and advantages of the present invention will become more apparent from the following description of embodiments thereof taken in conjunction with the accompanying drawings.

BRIEF DESCRIPTION OF THE DRAWINGS

FIGS. 4A–4F are views showing the results of measurements of the group delay dispersion characteristics of the optical demultiplexer according to the first embodiment of the present invention;

DESCRIPTION OF THE PREFERRED EMBODIMENTS

Embodiments of the present invention will be described below in detail with reference to the drawings.

First Embodiment

Optical Demultiplexer

Figure 1:
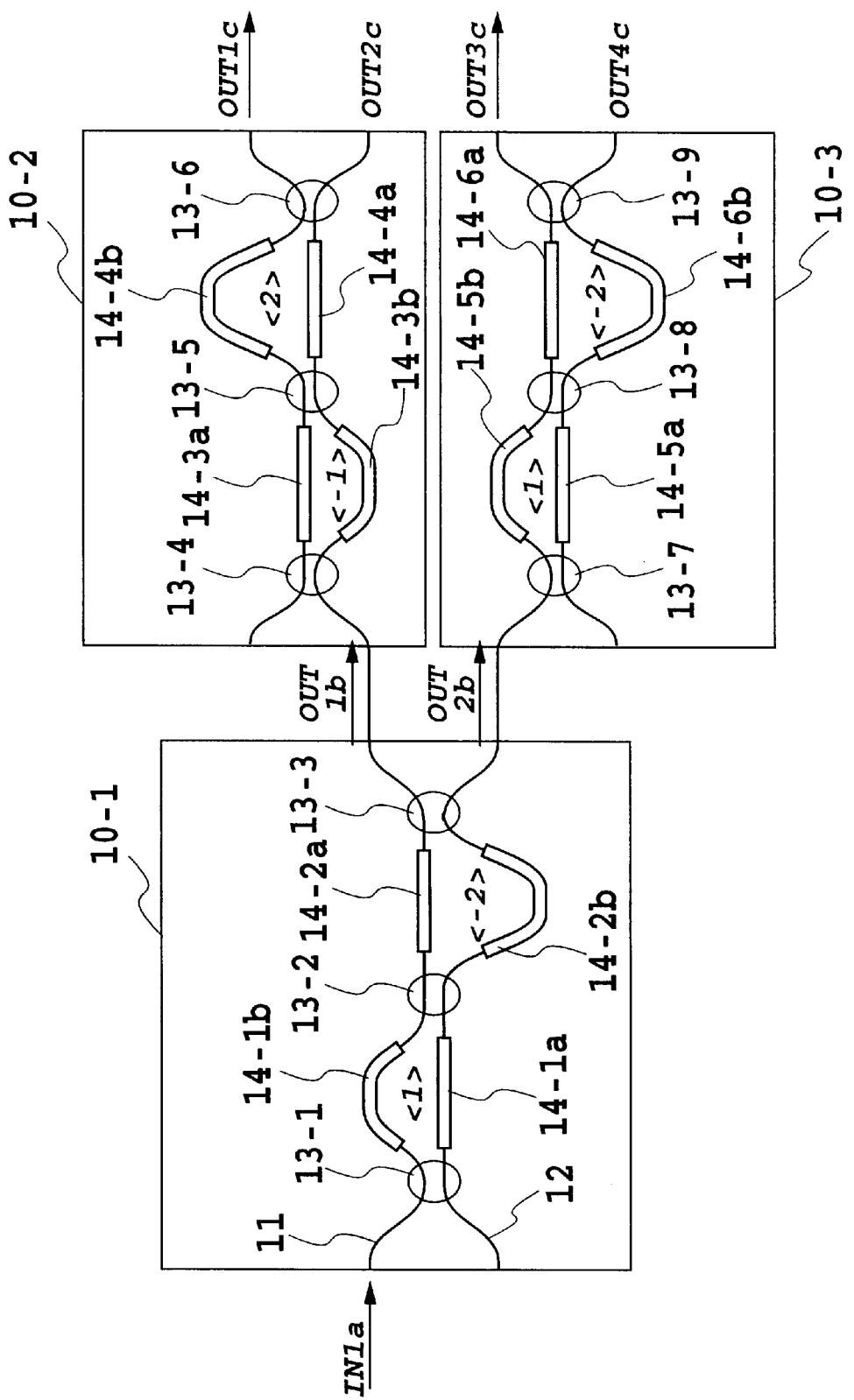
FIG. 1 is a view showing the circuit configuration of an optical demultiplexer according to a first embodiment of the present invention.

FIG. 1 shows the circuit configuration of an optical demultiplexer according to a first embodiment of the present invention. Optical demultiplexer elements 10-1, 10-2, and 10-3 have a two-stage Mach-Zehnder configuration having optical path length differences of 1:−2, −1:2, and 1:−2, respectively. The positive optical path length difference is defined to mean that in the two arms of each Mach-Zehnder circuit, the upper arm has a larger optical path length than the lower arm. On the other hand, the negative optical path length difference is defined to mean that the lower arm has a larger optical path length than the upper arm.

In the first embodiment, optical couplers are directional couplers. Directional couplers 13-1, 13-4, and 13-7 are 3 dB couplers. Directional couplers 13-2, 13-5, and 13-8 have the same coupling ratio, while directional couplers 13-3, 13-6, and 13-9 have the same coupling ratio. Phase shifters 14-1 to 14-6 are installed on each optical path to control phase. The phase shifter 14-1 changes the refractive index of either a waveguide 14-1a or a waveguide 14-1b to provide a phase difference to signal light passing through each waveguide.

An optical demultiplexer is composed of optical demultiplexer elements 10-1, 10-2, and 10-3 connected together in tandem in two stages so that the one optical demultiplexer element 10-1 is disposed in the 1st stage, while the two optical demultiplexer elements 10-2 and 10-3 are disposed in the 2nd stage. The optical demultiplexer element 10-2 has an optical path length difference of −1:2, while the optical demultiplexer elements 10-1 and 10-3 have the opposite optical path length difference of 1:−2.

The two phase shifters 14-1 and 14-2 of the optical demultiplexer element 10-1 in the 1st stage have a phase amount of zero. The phase shifters 14-3 and 14-5 of the optical demultiplexer elements 10-2 and 10-3, respectively, in the 2nd stage have a phase amount of $\pi$, and the phase shifters 14-4 and 14-6 have a phase amount of zero. The phase shifters 14-3 and 14-5 have a phase amount of $\pi$ in order to cause the transmission characteristics of the optical demultiplexer elements 10-2 and 10-3 in the 2nd stage to deviate from the transmission characteristics of the optical demultiplexer element 10-1 by half a period. In this manner, the passband of a through output port of the optical demultiplexer element 10-1 can be matched with the passband of a cross output port of the optical demultiplexer element 10-2. Further, the passband of a cross output port of the optical demultiplexer element 10-1 can be matched with the passband of a through output port of the optical demultiplexer element 10-3.

Of two output ports OUT1c and OUT2c of the optical demultiplexer element 10-2 in the 2nd stage, the cross output port OUT1c is selected for output, the optical demultiplexer element 10-2 being connected to the through output OUT1b of the optical demultiplexer element 10-1 in the 1st stage. Further, of two output ports OUT3c and OUT4c of the optical demultiplexer element 10-3 in the 2nd stage, the cross output port OUT3c is selected for output, the optical demultiplexer element 10-3 being connected to the cross output port OUT2b of the optical demultiplexer element 10-1 in the 1st stage.

Optical Multiplexer

Figure 2:
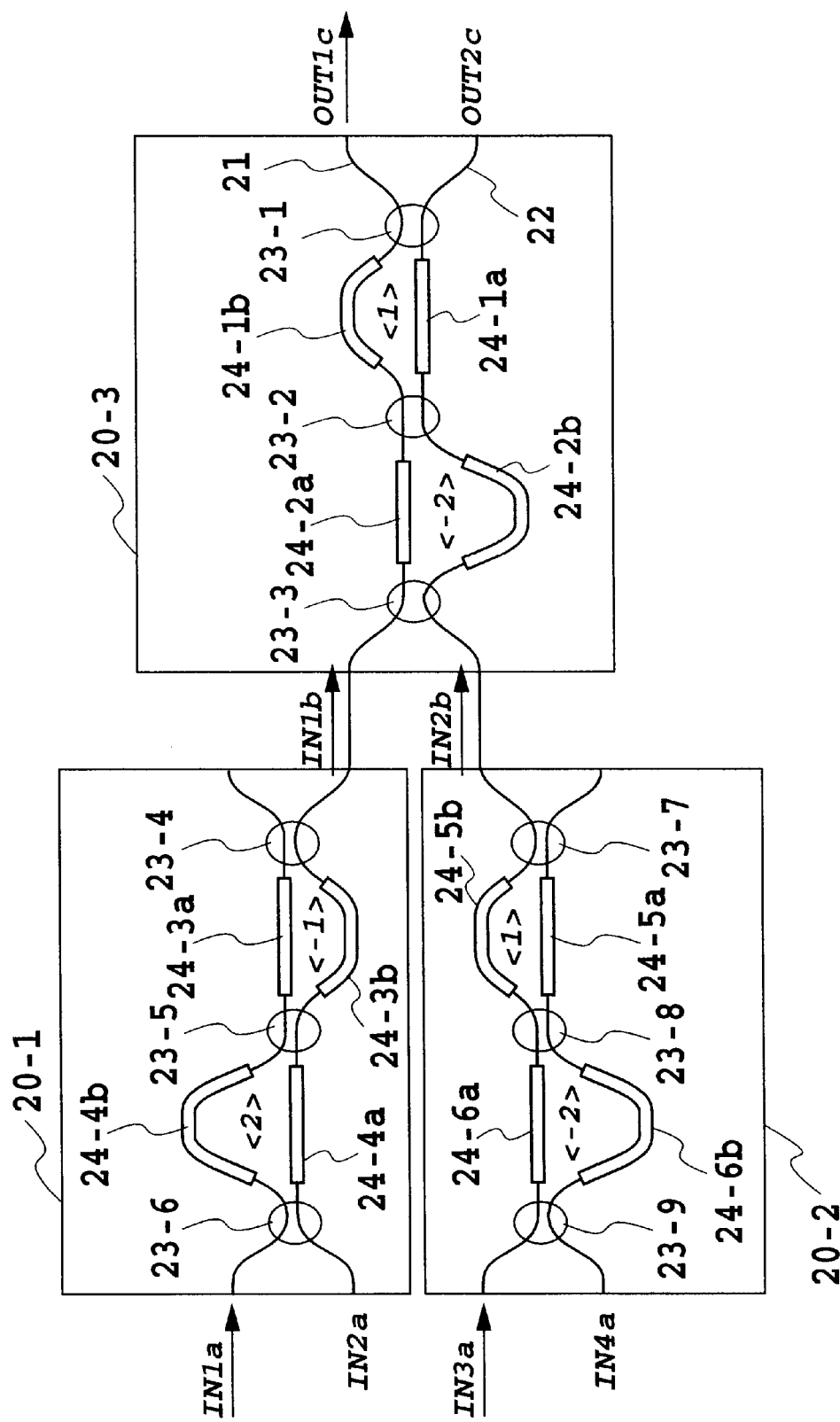
FIG. 2 is a view showing the circuit configuration of an optical multiplexer according to the first embodiment of the present invention.

FIG. 2 is a view showing the circuit configuration of an optical multiplexer according to the first embodiment of the present invention. Optical multiplexer elements 20-1, 20-2, and 20-3 have a two-stage Mach-Zehnder configuration having optical path length differences of 2:−1, −2:1, and −2:1, respectively. Directional couplers 23-1, 23-4, and 23-7 are 3 dB couplers. Directional couplers 23-2, 23-5, and 23-8 have the same coupling ratio, while directional couplers 23-3, 23-6, and 23-9 have the same coupling ratio. Phase shifters 24-1 to 24-6 are installed on each optical path to control phase.

An optical multiplexer is composed of optical multiplexer elements 20-1, 20-2, and 20-3 connected together in tandem in two stages so that the two optical multiplexer elements 20-1 and 20-2 are disposed in the 1st stage, while the one optical multiplexer element 20-3 is disposed in the 2nd stage. The optical multiplexer element 20-1 has an optical path length difference of 2:−1, whereas the optical multiplexer elements 20-2 and 20-3 have the opposite optical path length difference of −1:2.

The two phase shifters 24-1 and 24-2 of the optical multiplexer element 20-3 in the 2nd stage have a phase amount of zero. The phase shifters 24-3 and 24-5 of the optical multiplexer elements 20-1 and 20-2, respectively, in the 1st stage have a phase amount of $\pi$, and the phase shifters 24-4 and 24-6 have a phase amount of zero. The phase shifters 24-3 and 24-5 have a phase amount of $\pi$ in order to cause the transmission characteristics of the optical multiplexer elements 20-1 and 20-2 in the 1st stage to deviate from the transmission characteristics of the optical multiplexer element 20-3 by half a period. In this manner, the passband of a through output port of the optical multiplexer element 20-3 can be matched with the passband of a cross output port of the optical multiplexer element 20-1. Further, the passband of a cross output port of the optical multiplexer element 20-3 can be matched with the passband of a through output port of the optical multiplexer element 20-2.

Of two input ports IN1a and IN2a of the optical multiplexer element 20-1 in the 1st stage, the cross input port IN1a is selected for input, the optical multiplexer element 20-1 being connected to the through output In1b of the optical multiplexer element 20-3 in the 2nd stage. Further, of two input ports IN3a and IN4a of the optical multiplexer element 20-2 in the 1st stage, the cross input port IN3a is selected for input, the optical multiplexer element 20-2 being connected to the cross input port IN2b of the optical multiplexer element 20-3 in the 2nd stage.

The optical demultiplexer and the optical multiplexer are similarly described, and thus only the optical demultiplexer will be described below. However, the present invention is not limited to the optical demultiplexer, but the description of the optical demultiplexer is similarly applicable to the optical multiplexer.

In this case, the optical multiplexer elements as components have an optical path length difference of 1:−2, but arbitrary optical multiplexer elements of an optical path length difference of ±1:±2 (the symbol ± hereinafter indicates that either + or − is to be selected) can be produced by varying the coupling ratios of the directional couplers or the phase amounts of the phase shifters. In this embodiment, the optical multiplexer elements have the two-stage Mach-Zehnder configuration (corresponding to N=2), but it may be replaced with optical multiplexer elements having a three-or-more-stage Mach-Zehnder configuration (corresponding to N≧3). In this case, the circuit configuration is the same as that in the two stage configuration, but the optical path length difference is ±1:±2:±2: . . . :±2. Further, for the three-stage configuration, the optical path length difference may be ±1:±2:±4.

In the optical demultiplexer shown in FIG. 1, the optical demultiplexer element 10-1 in the 1st stage and the optical demultiplexer elements 10-2 and 10-3 in the 2nd stage are of the same type except for the phase amounts of the phase shifters. For example, as in the case with an optical demultiplexer described later in a second embodiment, optical demultiplexer elements having different filter characteristics may be used so that the 1st stage is composed of a maximally flat filter and the 2nd stage is composed of a filter having equi-ripple characteristics in the passband and stopband.

Description of Operation

With reference to FIG. 1, an explanation will be given of an operation of the optical demultiplexer performed when a wavelength multiplex signal is input from the input port IN1$a$ of the optical demultiplexer element 10-1 in the 1st stage. A transfer function $G_1(z)$ is set between the input port IN1$a$ and through output port OUT1$b$ of the optical demultiplexer element 10-1. A transfer function $H_1(z)$ is set between the input port IN1$a$ and cross output port OUT2$b$ of the optical demultiplexer element 10-1. Here, z denotes a z variable for Z conversions used in the field of digital filters, and is defined by $z=\exp(j2\pi\omega/\omega 0)$. $\omega 0$ denotes a frequency spacing of optical signal.

When the transfer function between the through output port OUT1$b$ of the optical demultiplexer element 10-1 and the cross output port OUT1$c$ of the optical demultiplexer element 10-2 is represented as $H_2(-z)$, the transfer function between the input port IN1$a$ of the optical demultiplexer element 10-1 and the cross output port OUT1$c$ of the optical demultiplexer element 10-2 is represented as $G_1(z)H_2(-z)$. Here, the subscripts 1 and 2 of the transfer functions represent the 1st and 2nd stages, respectively. Further, $-z$ represents a deviation by half a period as is apparent from the definition of z. Since the phase shifters 14-3 and 14-5 of the optical demultiplexer elements 10-2 and 10-3, respectively, in the 2nd stage, the characteristics of the optical demultiplexer element 10-2 deviate from the characteristics of the optical demultiplexer element 10-3 by half a period, and the transfer function is a function of $-z$.

In the 2nd stage, the characteristics of the optical demultiplexer element 10-2 thus deviate from the characteristics of the optical demultiplexer element 10-3 in order to match the passband of the through output port of the optical demultiplexer element 10-1 in the 1st stage with the passband of the cross output port of the optical demultiplexer element 10-2 in the 2nd stage and to match the passband of the cross output port of the optical demultiplexer element 10-1 in the 1st stage with the passband of the through output port of the optical demultiplexer element 10-3 in the 2nd stage.

When the transfer function between the cross output port OUT2$b$ of the optical demultiplexer element 10-1 and the through output port OUT3$c$ of the optical demultiplexer element 10-3 is represented as $G_2(-z)$, the transfer function between the input port IN1$a$ of the optical demultiplexer element 10-1 and the through output port OUT3$c$ of the optical demultiplexer element 10-3 is represented as $H_1(z)G_2(-z)$.

In the configuration of the optical demultiplexer shown in FIG. 1, the optical demultiplexer elements 10-2 and 10-3 in the 2nd stage use the same directional couplers as those in the 1st stage to cause phase to deviate by $\pi$ using Mach-Zehnder circuits having an optical path length difference of 1. Accordingly, the transmission characteristics of the optical demultiplexer elements 10-2 and 10-3 in the 2nd stage deviate from the transmission characteristics of the optical demultiplexer element 10-1 in the 1st stage by half a period. That is, the transfer functions for the optical demultiplexer elements 10-2 and 10-3 in the 2nd stage are obtained by subjecting the transfer function for the optical demultiplexer element 10-1 in the 1st stage to $z \rightarrow -z$ conversion.

Here, these functions are represented as $G_1(z)=G(z)$, $G_2(-z)=G(-z)$, $H_1(z)=H(z)$, and $H_2(-z)=H(-z)$. If these equations are used, then as the transfer functions for the entire optical demultiplexer, the transfer function between the 1st stage through output port and the 2nd stage cross output port (IN1$a \rightarrow$OUT1$b \rightarrow$OUT1$c$) is represented as $G(z)H(-z)$, and the transfer function between the 1st stage cross output port and the 2nd stage through output port (IN1$a \rightarrow$OUT2$b \rightarrow$OUT3$c$) is represented as $H(z)G(-z)$. If the transfer function $G(z)H(-z)$ between the 1st stage through output port and the 2nd stage cross output port is subjected to $z \rightarrow -z$ conversion, it becomes equal to the transfer function $H(z)G(-z)$ between the 1st stage cross output port and the 2nd stage through output port. Accordingly, in the optical demultiplexer shown in FIG. 1, the transfer function between the 1st stage through output port and the 2nd stage cross output port becomes equal to the transfer function between the 1st stage cross output port and the 2nd stage through output port, which otherwise deviates therefrom by half pitch, in other words, the characteristics between the 1st stage through output port and the 2nd stage cross output port become equal to the characteristics between the 1st stage cross output port and the 2nd stage through output port, which otherwise deviate therefrom by half pitch.

In general, the condition (hereinafter referred to as the "interleave filter condition") under which the ideal passband of the optical demultiplexer elements shown in FIG. 1 has a bandwidth equal to that of the ideal stopband thereof is represented as follows:

$$G(z)=H^*(-z) \quad \text{(Equation 1)}$$

where $H^*(-z)=H^*(1/z^*)z^{-N}$. The relational expression of Equation 1 indicates that the through characteristics $G(z)$ of the optical demultiplexer elements equal the cross characteristics $H^*(-z)$ thereof, which have group delay characteristics opposite to those of the through output port and deviate therefrom by half a period. In this case, the transmission characteristics of the through and cross output ports are set to have opposite group delay characteristics in order to cause the group delay characteristics of a signal passing through the 1st stage through output port and the 2nd stage cross output port to offset the group delay characteristics of a signal passing through the 1st stage cross output port and the 2nd stage through output port, vice versa.

When the transfer function for the entire optical demultiplexer is specifically represented using Equation 1, the transfer function $G(z)H(-z)$ between the 1st stage through output port and the 2nd stage cross output port is $G(z)G^*(z)$, and the transfer function $H(z)G(-z)$ between the 1st stage cross output port and the 2nd stage through output port is $G^*(-z)G(-z)$. Thus, if the interleave filter condition in Equation 1 is met, the 1st stage through output port has transmission characteristics $G(z)$, while the 2nd stage cross output port has transmission characteristics $G^*(z)$, that is, inverse group delay characteristics. The 1st stage cross output port has transmission characteristics $G^*(-z)$, while the 2nd stage through output port has transmission characteristics $G(-z)$, that is, inverse group delay characteristics. Thus, the offset effect makes the group delay characteristics zero for both the characteristics between the 1st stage through output port and the 2nd stage cross output port and between the 1st stage cross output port and the 2nd stage through cross output port. Further, the characteristics between the 1st stage through output port and the 2nd stage cross output port become equal to the characteristics between the 1st stage cross output port and the 2nd stage through cross output port, which otherwise deviate therefrom by half a period.

However, if a fabrication error causes deviation from the interleave filter condition in Equation 1, the offset effect between the 1st stage and 2nd stage group delay characteristics is weakened to cause group delay. However, there remains the relationship that the characteristics between the 1st stage through output port and the 2nd stage cross output port become equal to the characteristics between the 1st stage cross output port and the 2nd stage through cross output port, which otherwise deviate therefrom by half a period, so that there remains the characteristic that the fabrication error is uniformly distributed to the characteristics between the 1st stage through output port and the 2nd stage cross output port and to the characteristics between the 1st stage cross output port and the 2nd stage through output port.

It is generally known that if a fabrication error causes the coupling ratios of the directional couplers to deviate uniformly, the through output port of the optical demultiplexer element has transmission characteristics different from those of the cross output port thereof. The optical demultiplexer of the present invention is not affected by fabrication errors because the difference in transmission characteristics between the through output port and cross output port of the optical demultiplexer element resulting from a fabrication error is uniformly distributed by passage through the 1st stage through output port and the 2nd stage cross output port and passage through the 1st stage cross output port and the 2nd stage through output port.

Figure 9:
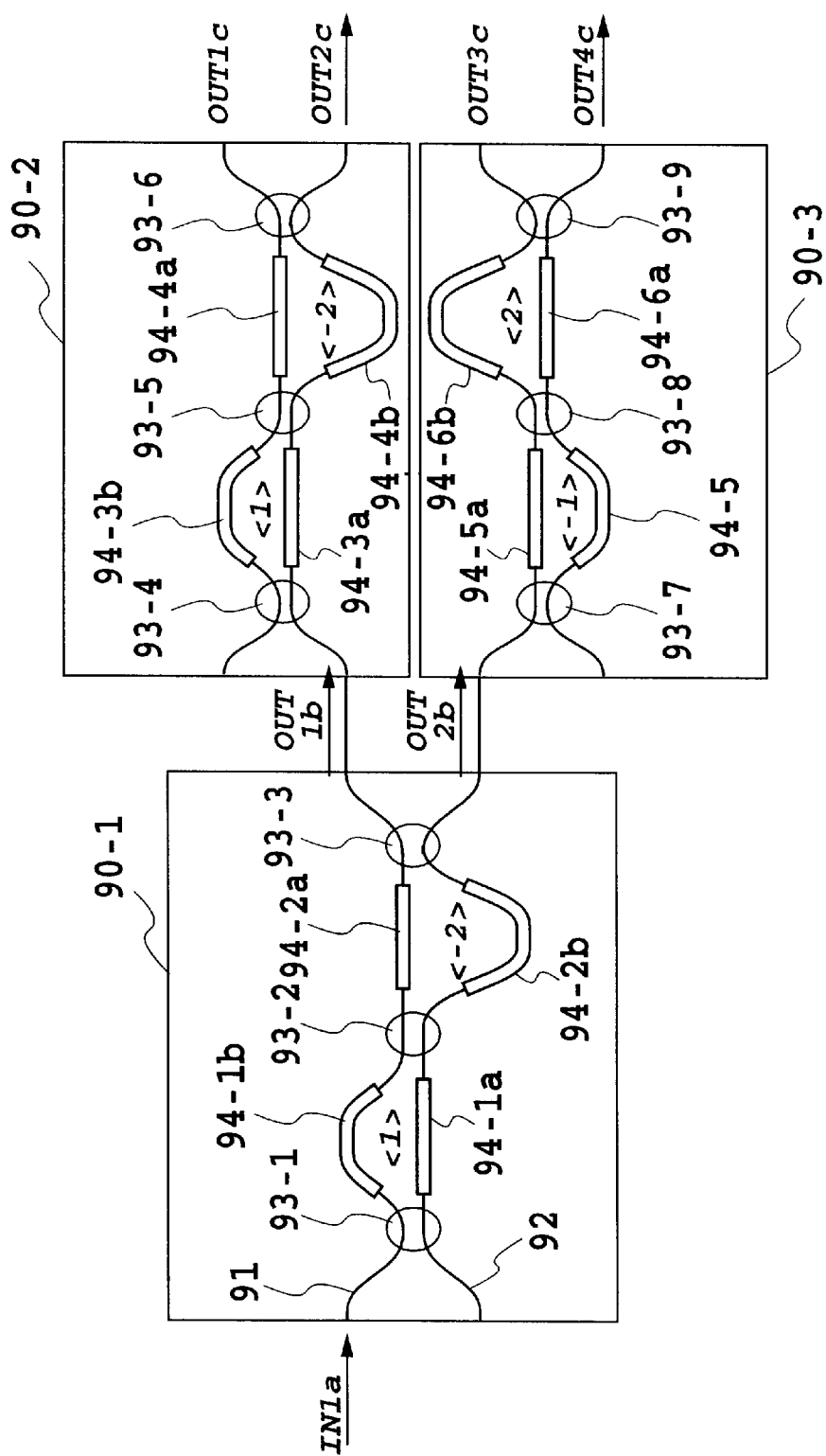
FIG. 9 is a view showing the circuit configuration of a conventional optical demultiplexer.

On the other hand, the conventional optical demultiplexer shown in FIG. 9 will be similarly considered. The conventional optical demultiplexer has such a circuit configuration that the 1st stage through output port is connected to the 2nd stage through output port, whereas the 1st stage cross output port is connected to the 2nd stage cross output port. The same optical demultiplexer elements are used in both the 1st and 2nd stages. With the notation described previously, the transfer function (IN1$a$→OUT1$b$→OUT2$c$) between the 1st stage through output port and the 2nd stage through output port is $G(z)G^*(z)$, whereas the transfer function (IN1$a$→OUT2$b$→OUT4$c$) between the 1st stage cross output port and the 2nd stage cross output port is $H(z)H^*(z)$. Consequently, due to the offset effect between the 1st stage group delay and the 2nd stage group delay, the group delay characteristics are always zero. In particular, the interleave filter condition in Equation 1 represents the transfer function between the 1st stage cross output port and the 2nd stage cross output port as $H(z)H^*(z)=G^*(-z)G(-z)$, so that the characteristics between the 1st stage through output port and the 2nd stage cross output port become equal to the characteristics between the 1st stage cross output port and the 2nd stage through cross output port, which otherwise deviate therefrom by half a period.

However, if a fabrication error causes deviation from the interleave filter condition, the characteristics between the 1st stage through output port and the 2nd stage through output port become equal to characteristics between the 1st stage cross output port and the 2nd stage cross output port by half a period. That is, in the optical demultiplexer elements, the difference between the characteristics between the 1st stage through output port and 2nd stage through output port and the characteristics between the 1st stage cross output port and the 2nd stage cross output port which difference results from a fabrication error tends to be increased by passage through the 1st stage through output port and the 2nd stage through output port and passage through the 1st stage cross output port and the 2nd stage cross output port. This is why the conventional optical demultiplexer is prone to be affected by fabrication errors.

Comparison of the conventional optical demultiplexer with the present one indicates that the former is advantageous in that the group delays are always zero. However, with a fabrication error in the optical demultiplexer element, the difference between the transmission characteristics of the through output port and the transmission characteristics of the cross output port which difference results from the fabrication error tends to be increased by passage through the 1st stage through output port and the 2nd stage through output port and passage through the 1st stage cross output port and the 2nd stage cross output port. Therefore, the conventional optical demultiplexer is prone to be affected by fabrication errors.

On the other hand, in the optical demultiplexer according to the present invention, even with a fabrication error, the difference between the transmission characteristics of the through output port and the transmission characteristics of the cross output port which difference results from the fabrication error is uniformly distributed by passage through the 1st stage through output port and the 2nd stage through output port and passage through the 1st stage cross output port and the 2nd stage cross output port. Consequently, the present optical demultiplexer is unlikely to be affected by fabrication errors. Further, in the optical demultiplexer of the present invention, the group delay characteristics are essentially not zero, but when the through and cross output ports of the optical demultiplexer element have opposite group delay characteristics, the offset effect between the 1st and 2nd stage group delay characteristics causes the group delay characteristics to approximate to zero. The offset effect between the 1st and 2nd stage group delay characteristics is most significant under the interleave filter condition (no fabrication errors), and in this case, the group delay is substantially zero.

Production and Evaluation

The optical demultiplexer shown in FIG. 1 was produced using a silica-based planar lightwave circuit. A 4-inch Si wafer was used as a substrate, and a desired circuit pattern was formed by using a flame hydrolysis deposition (FHD) technique and a reactive ion etching technique. Heaters fabricated above waveguides were activated to adjust the phase amount on the basis of thermooptic effects.

Optical demultiplexer elements were designed to have equi-ripple characteristics both in the passband and in the stopband. Directional couplers in the three optical demultiplexer element had the same coupling ratios. The coupling ratios of the directional couplers of the optical demultiplexer elements were, from the input port side, 50% for 13-1, 13-4, and 13-7, 34.8% for 13-2, 13-5, and 13-8, and 9.6% for 13-3, 13-6, and 13-9. The two phase shifters in the 1st stage optical demultiplexer element had a phase amount of zero. In the two 2nd stage optical demultiplexer elements, the phase shifter 14-3 and 14-5 had a phase amount of $\pi$, while the phase shifter 14-4 and 14-6 had a phase amount of 0.

In this embodiment, the directional couplers were used as optical couplers, but other optical couplers such as MMI (Multi Mode Interference) couplers may be used. Further, in this embodiment, the optical demultiplexer was produced using the silica-based planar lightwave circuit, but the circuit may be produced using other materials such as $SiO_N$. Furthermore, the optical waveguides may be producing using optical fibers as well as the planar lightwave circuit. Moreover, the heaters utilizing thermooptic effects were used as phase shifters, but the phase shifters may be based on other principles such as electro-optic effects. Thus, the present invention relates to the circuit configuration of the optical demultiplexer and is not restricted to implementing means therefor. Further, the circuit parameters used in the present invention are designed values and may vary depending on design conditions. Therefore, the present invention is not restricted to the circuit parameters.

In general, in planar lightwave circuits, fabrication errors are mainly associated with the coupling ratios of the directional couplers, and it is known that on the same wafer, equivalent errors occur in the coupling ratios of all the directional couplers in the same direction. The phase shifter are implemented as heating effected by the heaters and allow the shift amounts thereof to be variably set, so that the phase shift amount is not considered to be a fabrication error factor. In this embodiment, the optical demultiplexer was intentionally produced to have an error in coupling ratio in order to check its dependency on fabrication errors.

Figure 3A:
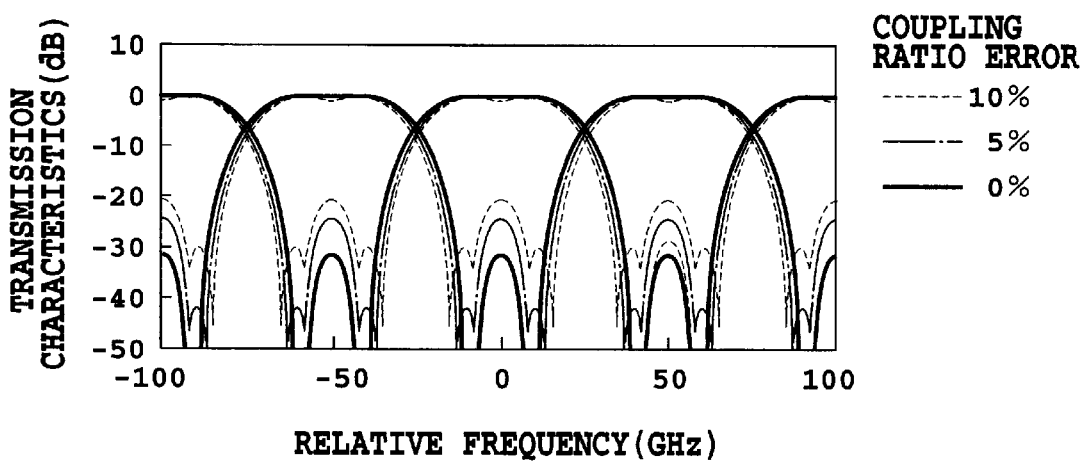
FIG. 3A is a view showing the results of measurements of the transmission characteristics of the optical demultiplexer according to the first embodiment of the present invention.
Figure 3B:
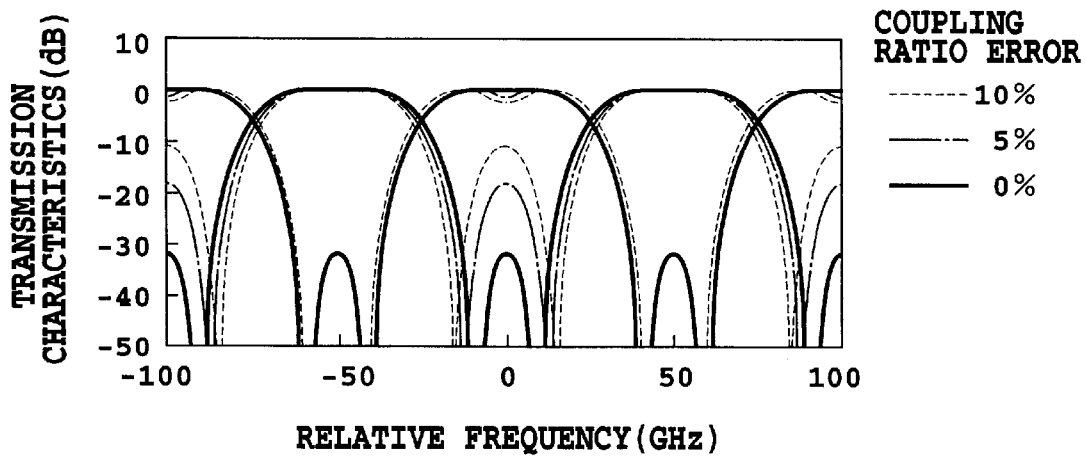
FIG. 3B is a view showing the results of measurements of the transmission characteristics of a conventional optical demultiplexer.
Figure 4C:
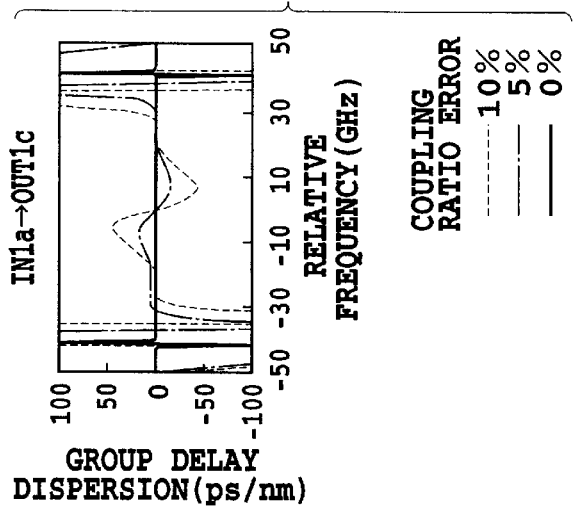
Figure 4B:
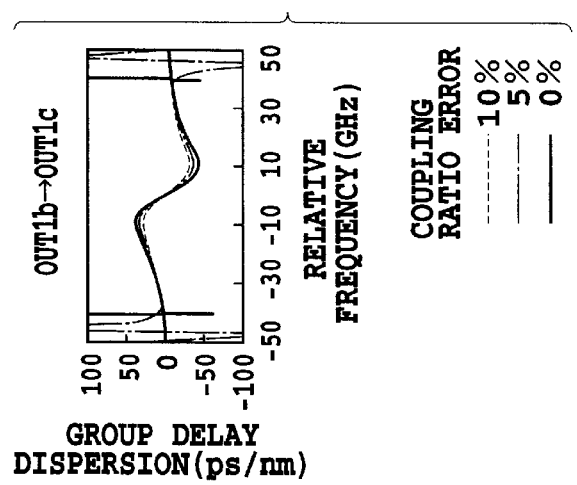
Figure 4A:
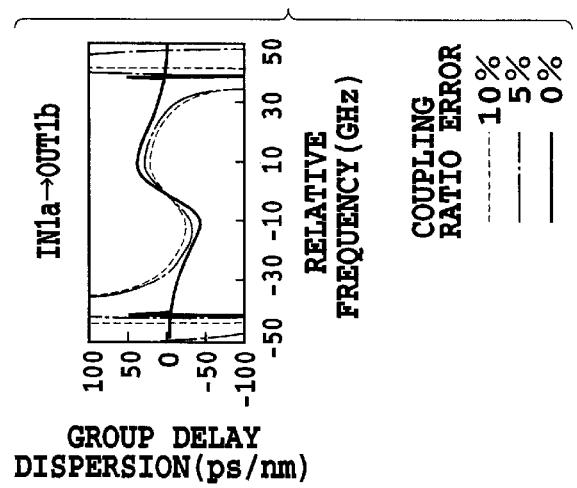

FIG. 3A shows the results of measurements of the transmission characteristics of the optical demultiplexer according to the first embodiment of the present invention. These are the results of examination of the transmission characteristics obtained when the coupling ratios of all the directional couplers of the optical demultiplexer were reduced by about 0, 5, and 10%. FIG. 3B shows the results of measurements of the transmission characteristics of a conventional optical demultiplexer. For comparison, the conventional optical demultiplexer shown in FIG. 9 was produced to check its dependency on fabrication errors.

Period frequency was 100 GHz. In the optical demultiplexer according to the present invention, the variation of the transmission characteristics (hereinafter simply referred to as the "through cross transmission characteristics") between the 1st stage through output port and the 2nd stage cross output port (IN1$a$→OUT1$b$→OUT1$c$) in response to a fabrication error is comparable to the variation of the transmission characteristics (hereinafter simply referred to as the "cross through transmission characteristics") between the 1st stage cross output port and the 2nd stage through output port (IN1$a$→OUT2$b$→OUT3$c$) in response to a fabrication error. For example, for a coupling ratio error of 10%, the stopband has a stop value of about −22 dB. On the other hand, in the conventional optical demultiplexer, the transmission characteristics (hereinafter simply referred to as the "cross cross transmission characteristics") between the 1st stage cross output port and the 2nd stage cross output port (IN1$a$→OUT2$b$→OUT4$c$) do not substantially vary even with a fabrication error, but the transmission characteristics (hereinafter simply referred to as the "through through transmission characteristics") between the 1st stage through output port and the 2nd stage through output port (IN1$a$→OUT1$b$→OUT2$c$) vary sharply. For example, for a coupling ratio error of 10%, the stopband for the through through transmission characteristics has a stop value of about −10 dB. The difference between the through through transmission characteristics and the cross cross transmission characteristics caused by a fabrication error is associated with a difference in the dependency on fabrication errors between the transmission characteristics of the through output port and the transmission characteristics of the cross output port thereof the optical demultiplexer element, which is a component of the optical demultiplexer.

If the coupling ratios of the directional couplers deviate in the same direction, for example, all the coupling ratios decrease, then the stop value of the transmission characteristics of the through output port of the optical demultiplexer element is degraded, but the fabrication error in the transmission characteristics of the cross output port does not vary significantly. Thus, in the conventional optical demultiplexer, in the case of the through through transmission characteristics, fabrication errors are accumulated to become gross. In the present invention, a gross fabrication error in the transmission characteristics of the through output port is uniformly distributed to the through cross transmission characteristics and to the cross through transmission characteristics, thereby hindering a generally gross fabrication error in transmission characteristics.

FIGS. 4A–4F show the results of measurements of the group delay dispersion characteristics of the optical demultiplexer according to the first embodiment of the present invention. The conventional optical demultiplexer employs a configuration that automatically zeroes group delay dispersion, but the optical demultiplexer according to this embodiment is designed so that the group delay dispersion is offset between the 1st stage and the 2nd stage. FIGS. 4A–4F also show the results of measurements of the group delay dispersion of each optical demultiplexer element.

For the group delay dispersion in IN1$a$→OUT1$b$→OUT1$c$ (hereinafter simply referred to as the "through cross group delay dispersion"), the group delay dispersion (IN1$a$→OUT1$b$) in the through output port of the optical demultiplexer element 10-1 in the 1st stage has characteristics opposite to those of the group delay dispersion (OUT1$b$→OUT1$c$) in the cross output port of the optical demultiplexer element 10-2 in the 2nd stage. Accordingly, without a fabrication error, the through cross group delay dispersion in the entire optical demultiplexer becomes substantially zero. Likewise, the group delay dispersion (IN1$a$→OUT2$b$) in the cross output port of the optical demultiplexer element 10-1 in the 1st stage has characteristics opposite to those of the group delay dispersion (OUT2$b$→OUT3$c$) in the through output port of the optical demultiplexer element 10-3 in the 2nd stage. Accordingly, without a fabrication error, the group delay dispersion in IN1$a$→OUT2$b$→OUT3$c$(hereinafter simply referred to as the "cross through group delay") becomes substantially zero.

With a fabrication error, both the group delay dispersion in the through output port of the optical demultiplexer element 10-1 in the 1st stage and the group delay dispersion in the cross output port of the optical demultiplexer element 10-2 in the 2nd stage deviate from their opposite characteristics, so that the grosser the fabrication error becomes, the more the through cross group delay dispersion in the entire optical demultiplexer deviates from zero. However, as is apparent from FIGS. 4A–4F, the maximum value of the group delay dispersion associated with fabrication errors is about 50 ps/nm even for a coupling ratio error of 10%. This value is substantially equivalent to the group delay dispersion in a single optical demultiplexer element having no fabrication error, and is not so large.

The circuit configuration of the optical demultiplexer shown in FIG. 1 has basically been described. The present invention is not limited to the circuit configuration in FIG. 1, so that other embodiments will be mentioned below.

Second Embodiment

Figure 5:
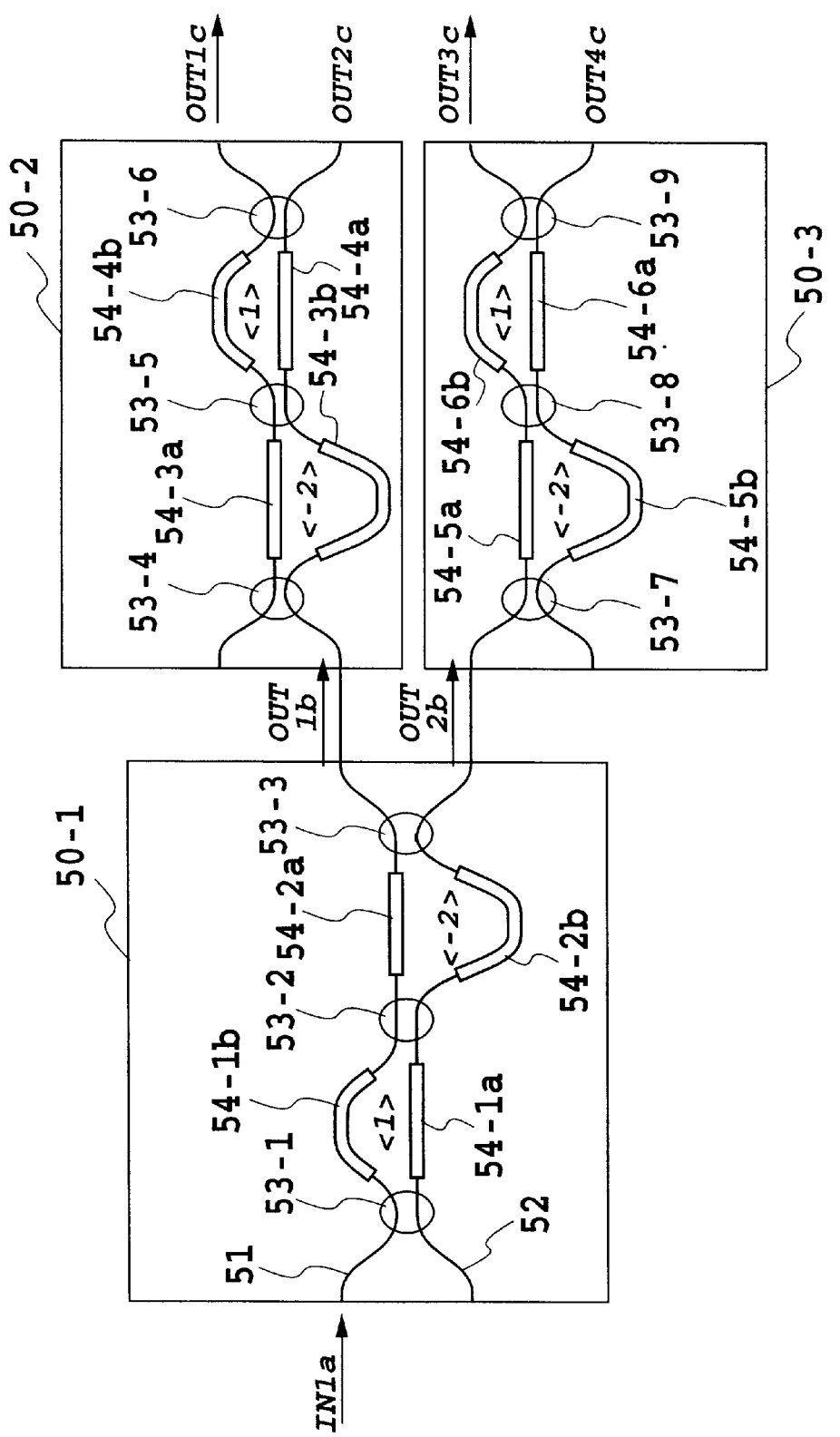
FIG. 5 is a view showing the circuit configuration of an optical demultiplexer according to a second embodiment of the present invention.
Figure 6A:
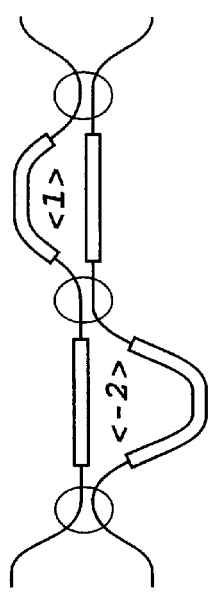
FIGS. 6A–6D are views showing a transfer function matrix for a circuit configuration obtained through a symmetry operation.
Figure 6B:
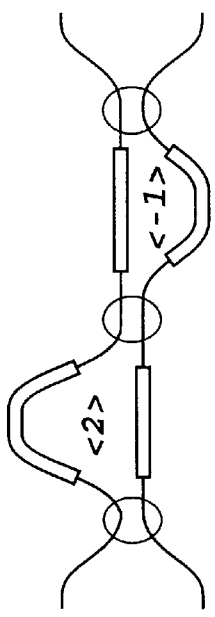
Figure 6C:
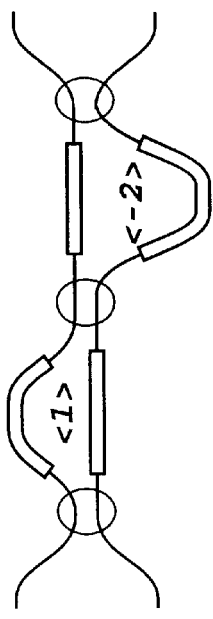
Figure 6D:
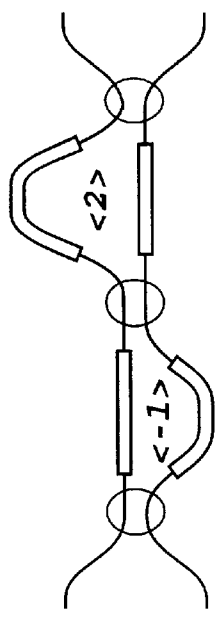

FIG. 5 is a view showing the circuit configuration of an optical demultiplexer according to a second embodiment of the present invention. This circuit configuration differs from that of the optical demultiplexer shown in FIG. 1 in the optical path length differences in an optical demultiplexer element 50-2 and an optical demultiplexer element 50-3. In this case, the optical path length differences in the optical demultiplexer element 50-2 and the optical demultiplexer element 50-3 are each −2:1.

Directional couplers 53-6, 53-5, and 53-4 in the optical demultiplexer element 50-2 in FIG. 5 correspond to the directional couplers 13-4, 13-5, and 13-6 in FIG. 1. Directional couplers 53-9, 53-8, and 53-7 in the optical demultiplexer element 50-3 in FIG. 5 correspond to the directional couplers 13-7, 13-8, and 13-9 in FIG. 1. Further, phase shifters 54-4 and 54-3 in the optical demultiplexer element 50-2 in FIG. 5 correspond to the phase shifters 14-3 and 14-4 in FIG. 1. Phase shifters 54-6 and 54-5 in the optical demultiplexer element 50-3 in FIG. 5 correspond to the phase shifters 14-5 and 14-6 in FIG. 1.

The optical demultiplexer element 50-2 in FIG. 5 is obtained by subjecting the optical demultiplexer element 10-2 in FIG. 1 to a symmetry operation so as to have an optical path length difference of −2:1. Similarly, the optical demultiplexer element 50-3 in FIG. 5 is obtained by subjecting the optical demultiplexer element 10-3 in FIG. 1 to a symmetry operation so as to have an optical path length difference of −2:1.

FIGS. 6A–6D show a transfer function matrix for a circuit configuration obtained through a symmetry operation. Now, FIGS. 6A–6D will be referenced to show that the circuit configuration meets the requirements of the present invention. In the circuit configuration in FIG. 5, the through cross transmission characteristics (IN1a→OUT1b→OUT1c) are expressed as the product of the transmission characteristics (IN1a→OUT1b)G(z) of the through output port of the optical demultiplexer element 50-1 and the transmission characteristics (OUT1b→OUT1c)H(−z) of the cross output port of the optical demultiplexer element 50-2. Thus, the through cross transmission characteristics (IN1a→OUT1b→OUT1c) is G(z)H(−z).

Likewise, the cross through transmission characteristics (IN1a→OUT2b→OUT3c) are expressed as the product of the transmission characteristics (IN1a→OUT2b)H(z) of the cross output port of the optical demultiplexer element 50-1 and the transmission characteristics (OUT2b→OUT3c) G(−z) of the through output port of the optical demultiplexer element 50-3. Thus, the cross through transmission characteristics (IN1a→OUT2b→OUT3c) is H(z)G(−z).

When the optical demultiplexer elements meet the interleave filter condition described in Equation 1, the transmission characteristics (IN1a→OUT1b) of the through output port of the optical demultiplexer element 50-1 are represented as G(z), whereas the transmission characteristics (OUT1b→OUT1c) of the cross output port of the optical demultiplexer element 50-2 is represented as G*(z). This indicates that the former has group delay characteristics opposite to those of the latter. Further, the transmission characteristics (IN1a→OUT2b) of the cross output port of the optical demultiplexer element 50-1 are represented as G*(−z), whereas the transmission characteristics (OUT2b→OUT3c) of the through output port of the optical demultiplexer element 50-3 is represented as G(−z). This also indicates that the former has group delay characteristics opposite to those of the latter.

The through cross transmission characteristics (IN1a→OUT1b→OUT1c) for the entire optical demultiplexer are G(z)G*(z), and the cross through transmission characteristics therefor is G*(−z)G(−z). Consequently, the group delay characteristics for the former offset the group delay characteristics for the latter, resulting in zero group delay dispersion.

Third Embodiment

Figure 7:
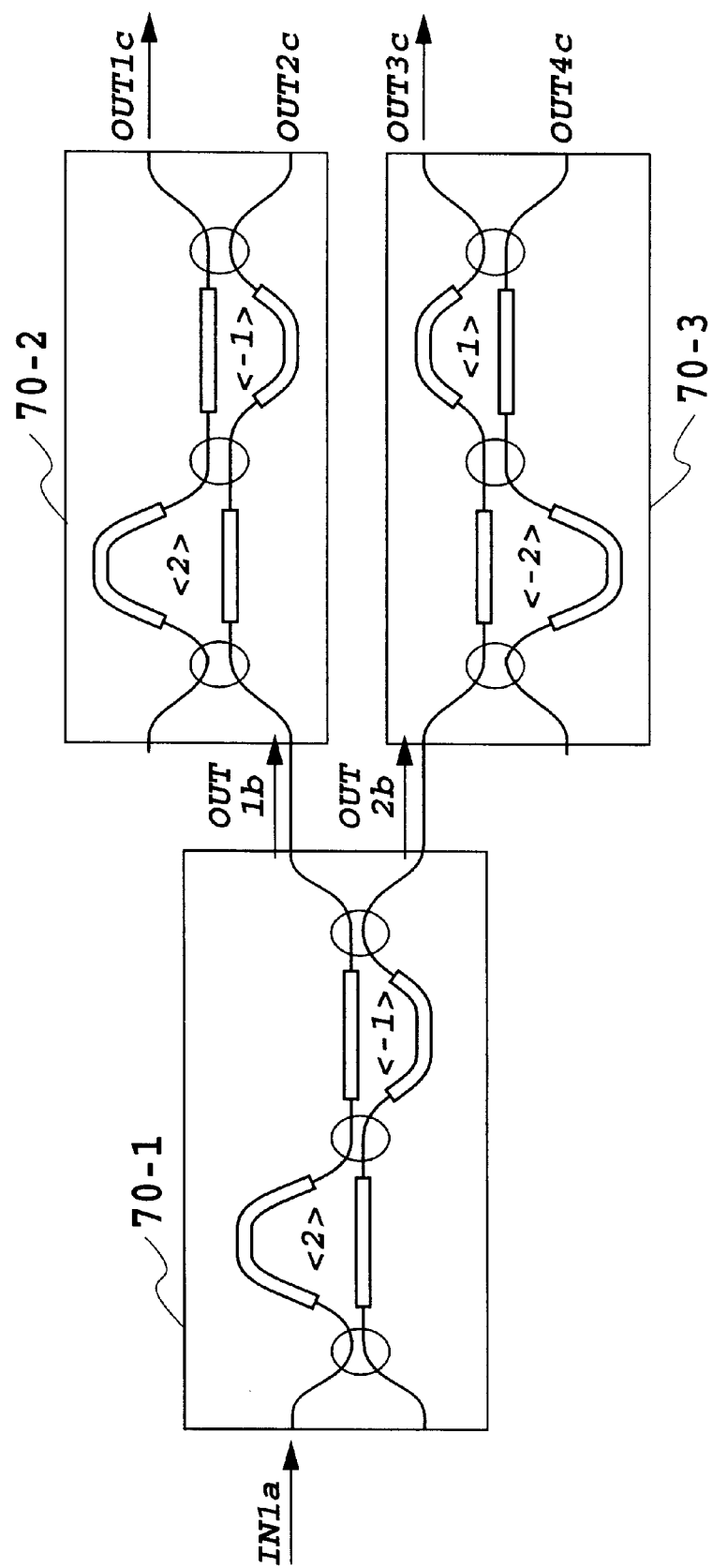
FIG. 7 is a view showing the circuit configuration of an optical demultiplexer according to a third embodiment of the present invention.

FIG. 7 shows the circuit configuration of an optical demultiplexer according to a third embodiment of the present invention. In this embodiment, a 1st stage output port is connected to a 2nd stage cross output port, and a 1st stage cross output port is connected to a 2nd stage through output port. With reference to FIGS. 6A to 6D, the characteristics in FIG. 7 will be calculated. The through cross transmission characteristics (IN1a→OUT1b→OUT1c) are expressed as the product of the transmission characteristics (IN1a→OUT1b)G*(z) of the through output port of the optical demultiplexer element 70-1 and the transmission characteristics (OUT1b→OUT1c)H*(−z) of the cross output port of the optical demultiplexer element 70-2. When the interleave filter condition described in Equation 1 is met, the transmission characteristics (IN1a→OUT1b) of the through output port of the optical demultiplexer element 70-1 are represented as G*(z), whereas the transmission characteristics (OUT1b→OUT1c) of the cross output port of the optical demultiplexer element 70-2 is represented as G(z). That is, the former has group delay characteristics opposite to those of the latter. Therefore, the through cross transmission characteristics (IN1a→OUT1b→OUT1c) is G*(z)G(z), resulting in zero group delay dispersion.

Likewise, the cross through transmission characteristics (IN1a→OUT2b→OUT3c) are expressed as the product of the transmission characteristics (IN1a→OUT2b)H(z) of the through output port of the optical demultiplexer element 70-1 and the transmission characteristics (OUT2b→OUT3c) G(−z) of the cross output port of the optical demultiplexer element 70-3. When the interleave filter condition is met, the transmission characteristics (IN1a→OUT2b) of the cross output port of the optical demultiplexer element 70-1 are represented as G*(−z), whereas the transmission characteristics (OUT2b→OUT3c) of the through output port of the optical demultiplexer element 70-3 is represented as G(z). That is, the former has group delay characteristics opposite to those of the latter. Therefore, the cross through transmission characteristics (IN1a→OUT2b→OUT3c) is G*(−z) G(−z), resulting in zero group delay dispersion.

Thus, the circuit configuration meeting the requirements of the present invention is not limited to the one shown in FIG. 1, but a plurality of such circuit configurations exist, including the ones shown in FIGS. 5 and 7.

Fourth Embodiment

The first embodiment is designed so that all the optical demultiplexer elements have equi-ripple characteristics in the stopband and passband. However, in the optical demultiplexer according to the present invention, not all the optical demultiplexer elements have the same characteristics. The case will be described in which the optical demultiplexer element in the 1st stage has the maximally flat transmission characteristics, whereas the two optical demultiplexer elements in the 2nd stage have equi-ripple characteristics.

As in the case with the circuit configuration shown in FIG. 1, the optical demultiplexer elements of this circuit have a two-stage Mach-Zehnder configuration. The coupling ratios of the directional couplers in the 1st stage optical demultiplexer element having maximally flat characteristics are, from the input port side, 50, 25, and 6.7%. The coupling ratios of the directional couplers in the 2nd stage optical demultiplexer element having equi-ripple characteristics are, from the input port side, 50, 34.8, and 9.6%. The optical path length differences and the phase amounts of the phase shifters are similar to those in the circuit configuration shown in FIG. 1. The connections of the input and output ports are also similar to those shown in FIG. 1.

Figure 8A:
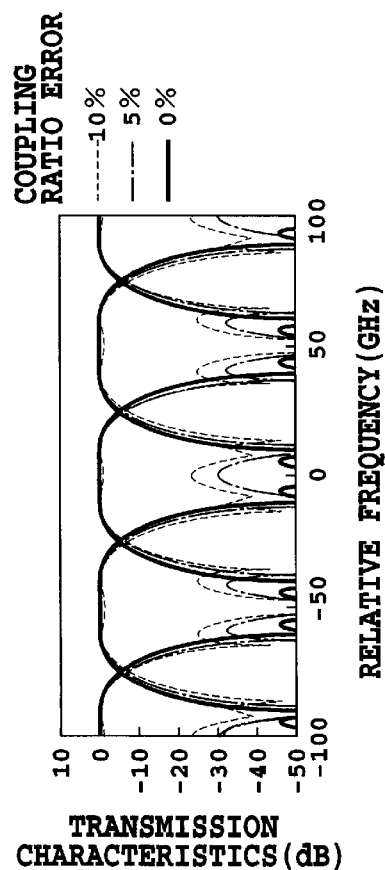
FIG. 8A is a view showing the results of measurements of the transmission characteristics of an optical demultiplexer according to a fourth embodiment of the present invention.
Figure 8C:
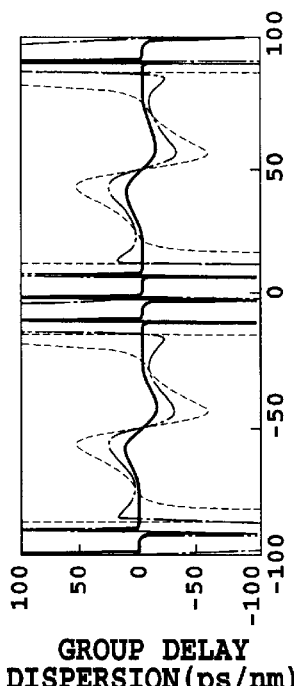
FIG. 8C is a view showing the results of measurements of the cross through group delay dispersion characteristics of the optical demultiplexer according to the fourth embodiment of the present invention.
Figure 8B:
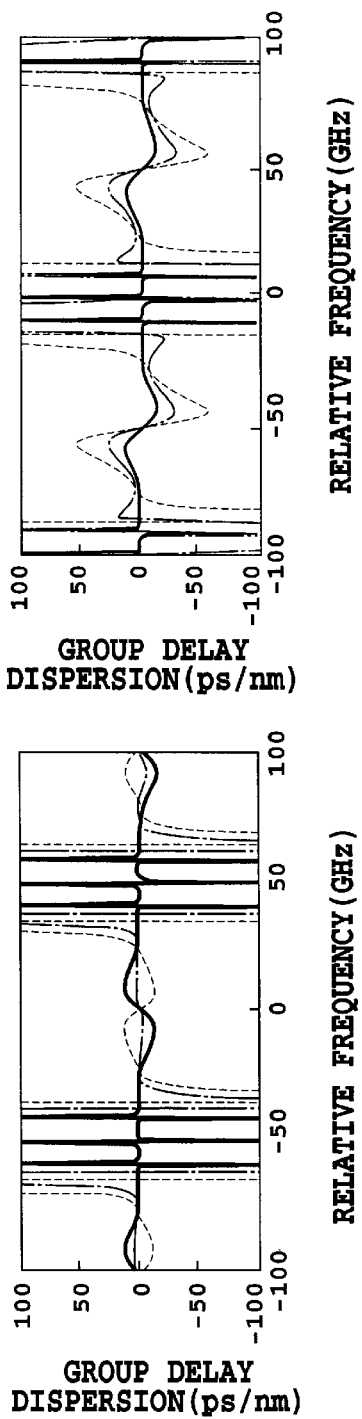
FIG. 8B is a view showing the results of measurements of the through cross group delay dispersion characteristics of the optical demultiplexer according to the fourth embodiment of the present invention.

FIG. 8A shows the results of measurements of the transmission characteristics of an optical demultiplexer according to a fourth embodiment of the present invention. FIG. 8B shows the results of measurements of the through cross group delay dispersion characteristics of the optical demultiplexer according to the fourth embodiment of the present invention. FIG. 8C shows the results of measurements of the cross through group delay dispersion characteristics of the optical demultiplexer according to the fourth embodiment of the present invention. These figures show the transmission characteristics and group delay dispersion characteristics of an optical demultiplexer produced using a silicon-based planar lightwave circuit.

This embodiment is designed so that the optical demultiplexer element in the 1st stage has maximally flat transmission characteristics, while the two optical demultiplexer elements in the 2nd stage have equi-ripple transmission characteristics. These different characteristics are selected so as to suppress the stop value for the stopband area, one of the transmission characteristics. Without any fabrication error (the coupling ratio error is 0%) as shown in FIG. 8A, the stop value is about −46 dB. Since the optical demultiplexer of the first embodiment shown in FIG. 3A has a stop value of about −32 dB, the fourth embodiment provides a significantly suppressed stop value. This is because the optical demultiplexer elements in the 1st and 2nd stages having different transmission characteristics are combined to successfully remove a mountain of transmission in the center of the stopband, shown in FIG. 3A. In this embodiment, the connections in FIG. 1 are also employed to uniformly distribute a fabrication error to the through cross transmission characteristics and to the cross through transmission characteristics.

As shown in FIG. 8B, in this embodiment, the group delay dispersion is not zero even without a fabrication error. This is because the optical demultiplexer element in the 1st stage has characteristics different from those of the optical demultiplexer element in the 2nd stage. However, in this embodiment, the through or cross output port of the optical demultiplexer element in the 1st stage basically has group delay dispersion substantially opposite to those of the through or cross output port of the optical demultiplexer element in the 2nd stage, so that the group delay dispersions in the 1st and 2nd stages offset each other. Thus, the group delay dispersion value is small though not zero. Even with a fabrication error, for example, for a coupling ratio error of 10%, the maximum group delay dispersion is about 60 ps/nm and is not so significant.

According to this embodiment, the deviation of the characteristics of the circuit caused by a fabrication error can be distributed to the transmission characteristics and to the group delay characteristics to maintain the group delay characteristics at an allowable value or less, thereby maintaining good transmission characteristics.

The present invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. An optical demultiplexer comprising 2-input and 2-output (hereinafter referred to as the "2×2") optical demultiplexer elements composed of optical couplers that couple two optical waveguides together at N+1 locations (N is an integer equal to or larger than 2), each said 2×2 optical demultiplexer element having a through output port and a cross output port for a single input port, in which a through output port of a first 2×2 optical demultiplexer element is connected to an input port of a second 2×2 optical demultiplexer element and a cross output port of said first 2×2 optical demultiplexer element is connected to an input port of a third 2×2 optical demultiplexer element, so that when a wavelength multiplex signal of a specified wavelength interval of $\lambda 1, \lambda 2, \ldots, \lambda M$ (M is an integer equal to or larger than 2) is input to an input port of said first 2×2 optical demultiplexer element, a wavelength multiplex signal of $\lambda 1, \lambda 3, \ldots, \lambda M-1$ is output from a selected output port of said second 2×2 optical demultiplexer element, while a wavelength multiplex signal of $\lambda 2, \lambda 4, \ldots, \lambda M$ is output from a selected output port of said third 2×2 optical demultiplexer element, wherein a cross output port of said second 2×2 optical demultiplexer element is selected, and a through output port of said third 2×2 optical demultiplexer element is selected, wherein the through output port of said first 2×2 optical demultiplexer element has a passband equal to that of the cross output port of said second 2×2 optical demultiplexer element, and the cross output port of said first 2×2 optical demultiplexer element has a passband equal to that of the through output port of said third 2×2 optical demultiplexer element, and wherein the through output port of said first 2×2 optical demultiplexer element has group delay characteristics opposite to those of the cross output port of said second 2×2 optical demultiplexer element, and the cross output port of said first 2×2 optical demultiplexer element has group delay characteristics opposite to those the through output port of said third 2×2 optical demultiplexer element.

2. An optical multiplexer comprising 2-input and 2-output (hereinafter referred to as the "2×2") optical multiplexer elements composed of optical couplers that couple two optical waveguides together at N+1 locations (N is an integer equal to or larger than 2), each said 2×2 optical multiplexer element having a through output port and a cross output port for a single input port, in which an output port of a first 2×2 optical multiplexer element is connected to a through input port of a third 2×2 optical multiplexer element and an output port of a second 2×2 optical multiplexer element is connected to a cross input port of said third 2×2 optical multiplexer element, so that when a wavelength multiplex signal of a specified wavelength interval of $\lambda 1, \lambda 3, \ldots, \lambda M-1$ (M is an integer equal to or larger than 2) is input to a selected input port of said first 2×2 optical multiplexer element, while a wavelength multiplex signal of a specified wavelength interval of $\lambda 2, \lambda 4, \ldots, \lambda M$ is input to a selected input port of said second 2×2 optical multiplexer element, then a wavelength multiplex signal of $\lambda 1, \lambda 2, \ldots, \lambda M$ is output from the output port of said third 2×2 optical multiplexer element, wherein a cross input port of said first 2×2 optical multiplexer element is selected, and a through input port of said second 2×2 optical multiplexer element is selected, wherein the through output port of said third 2×2 optical multiplexer element has a passband equal to that of the cross output port of said first 2×2 optical multiplexer element, and the cross output port of said third 2×2 optical multiplexer element has a passband equal to that of the through output port of said second 2×2 optical multiplexer element, and wherein the through output port of said third 2×2 optical multiplexer element has group delay characteristics opposite to those of the cross output port of said first 2×2 optical multiplexer element, and the cross output port of said third 2×2 optical multiplexer element has group delay characteristics opposite to those the through output port of said second 2×2 optical multiplexer element.

* * * * *